Figure 1:
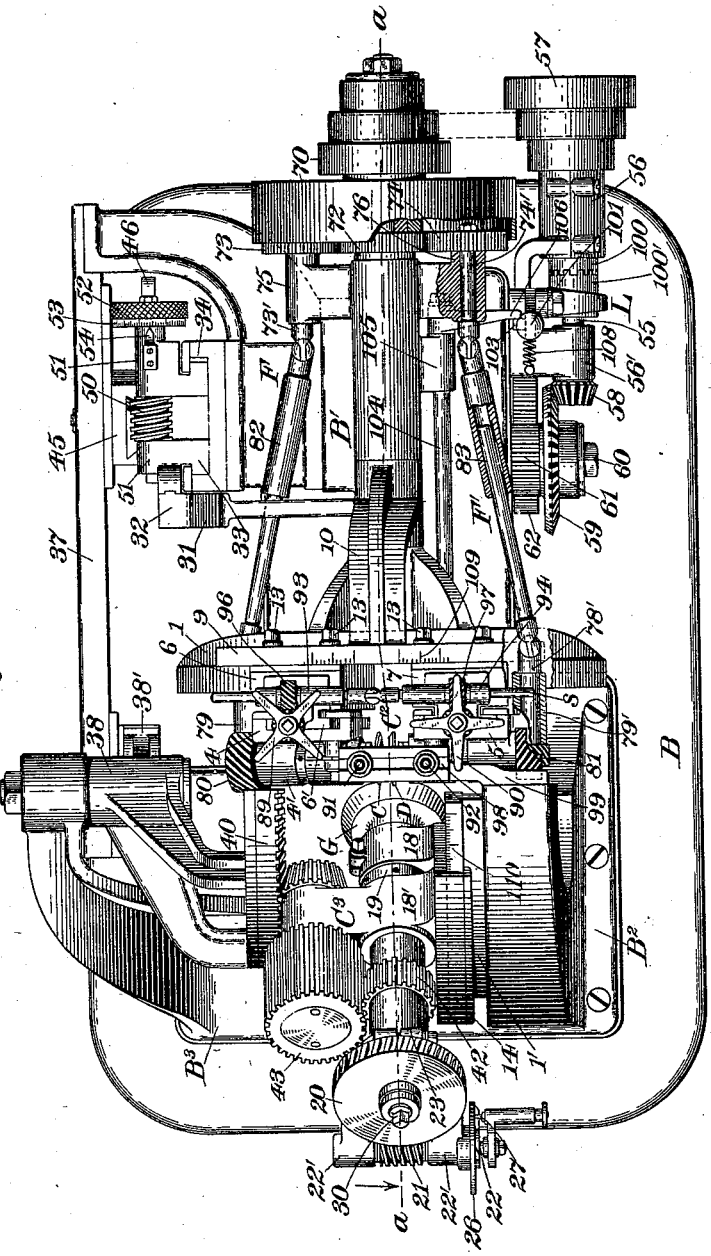

(No Model.) 10 Sheets—Sheet 1.

H. C. WARREN.
APPARATUS FOR CUTTING GEAR TEETH.

No. 547,571. Patented Oct. 8, 1895.

Witnesses.
J. L. Edwards Jr.
Fred. J. Dole.

Inventor:
Herbert C. Warren.
By his Attorney,
F. H. Richards (No Model.) 10 Sheets—Sheet 3.

H. C. WARREN.
APPARATUS FOR CUTTING GEAR TEETH.

No. 547,571. Patented Oct. 8, 1895.

Fig. 3.

Witnesses:
J. L. Edwards Jr.
Fred. J. Dole.

Inventor:
Herbert C. Warren,
By his Attorney,
F H Richards (No Model.) 10 Sheets—Sheet 4.
H. C. WARREN.
APPARATUS FOR CUTTING GEAR TEETH.
No. 547,571. Patented Oct. 8, 1895.
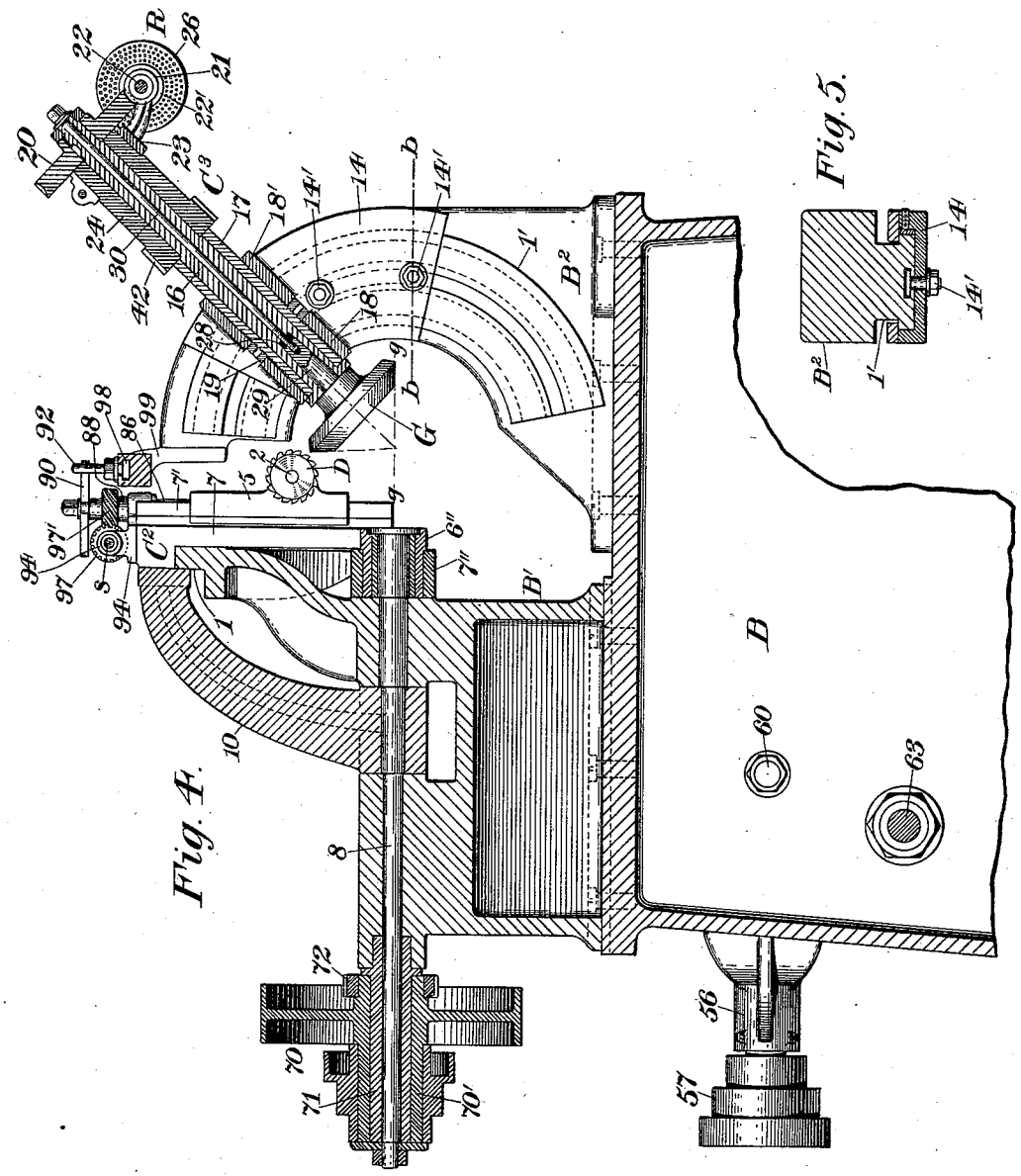
Witnesses:
J. L. Edwards Jr.
Fred. J. Dole.
Inventor:
Herbert C. Warren,
By his Attorney,
F. H. Richards.

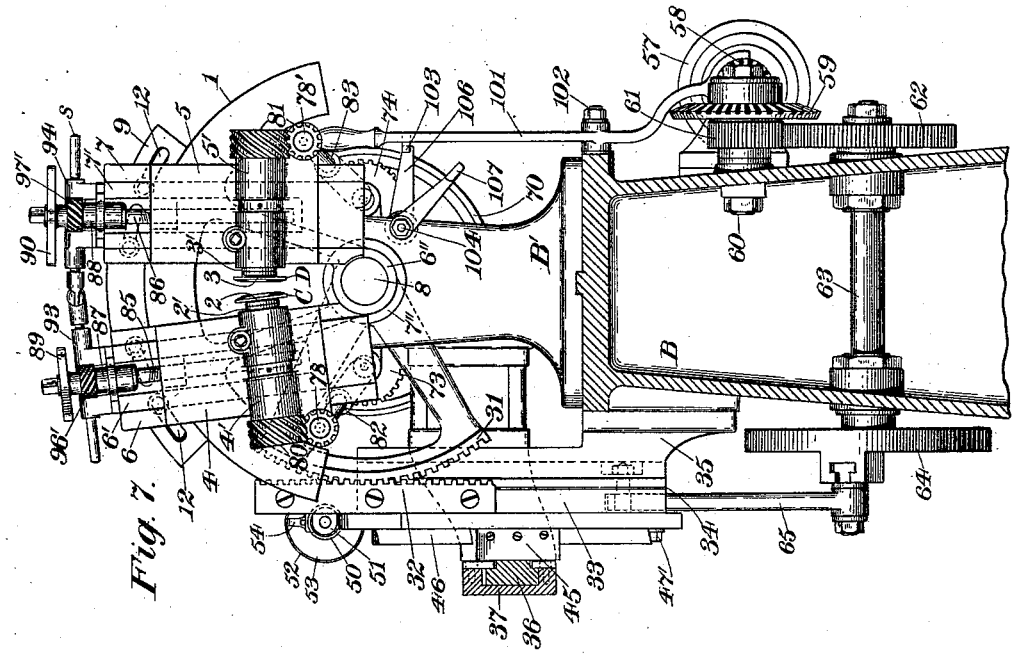

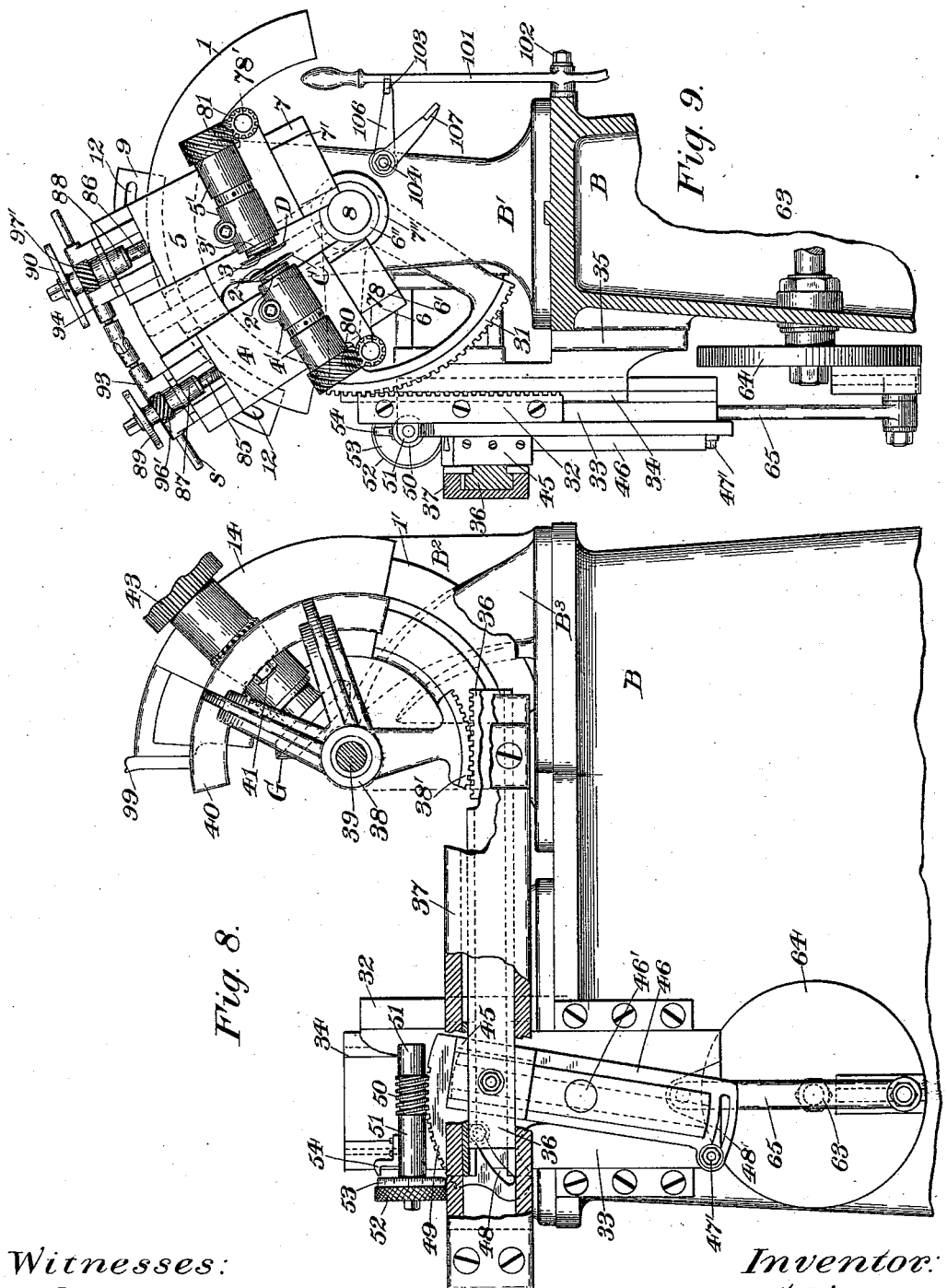

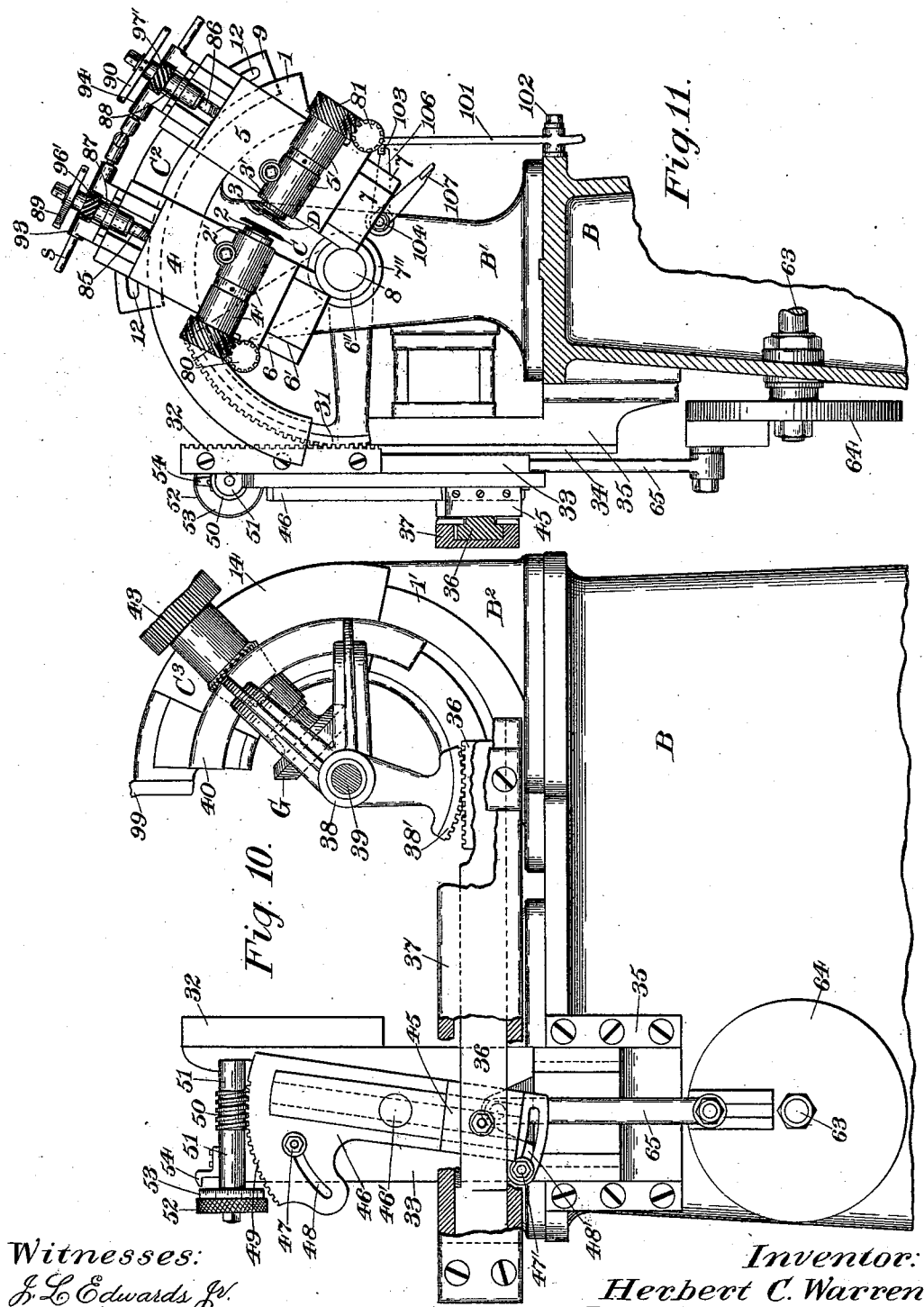

(No Model.) 10 Sheets—Sheet 8.
H. C. WARREN.
APPARATUS FOR CUTTING GEAR TEETH.
No. 547,571. Patented Oct. 8, 1895.
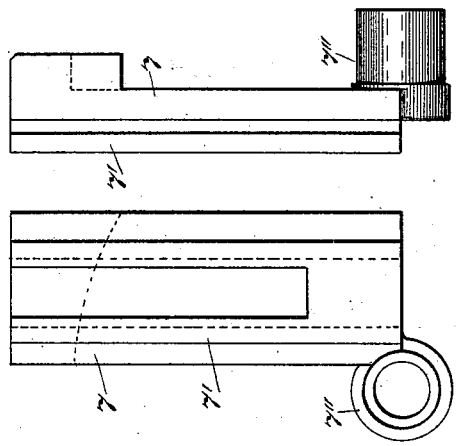
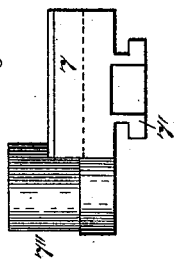
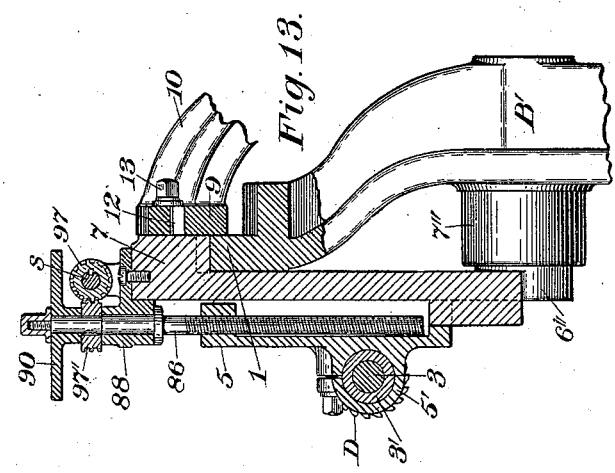
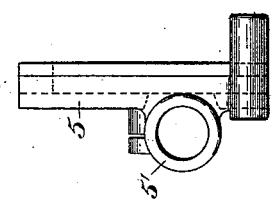
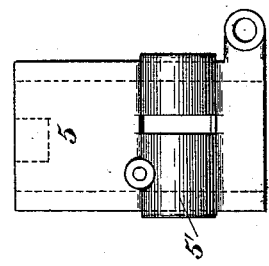
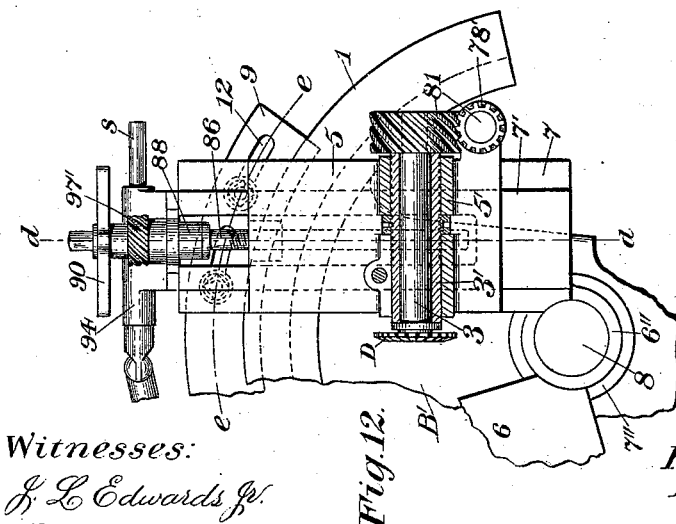
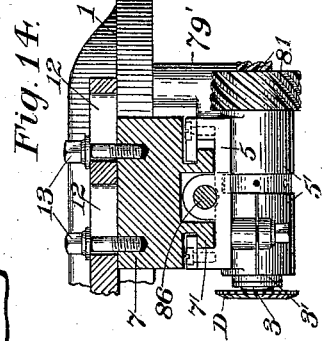
Witnesses:
J. L. Edwards Jr.
Fred. J. Dole.
Inventor:
Herbert C. Warren,
By his Attorney,
F. H. Richards.

(No Model.) 10 Sheets—Sheet 9.
H. C. WARREN.
APPARATUS FOR CUTTING GEAR TEETH.
No. 547,571. Patented Oct. 8, 1895.
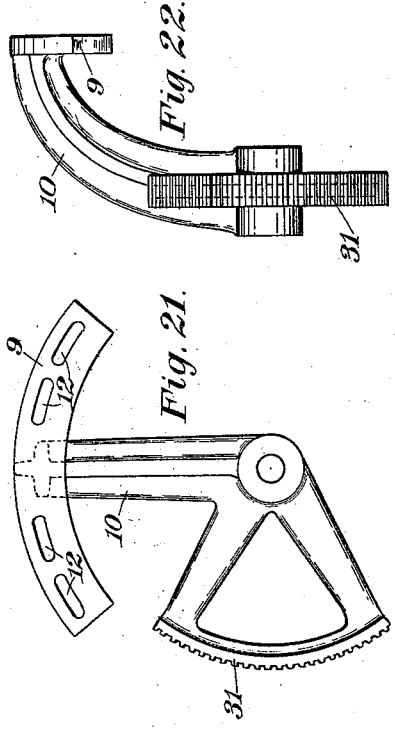
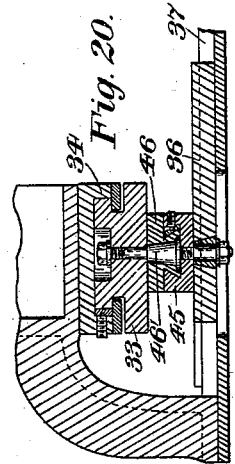
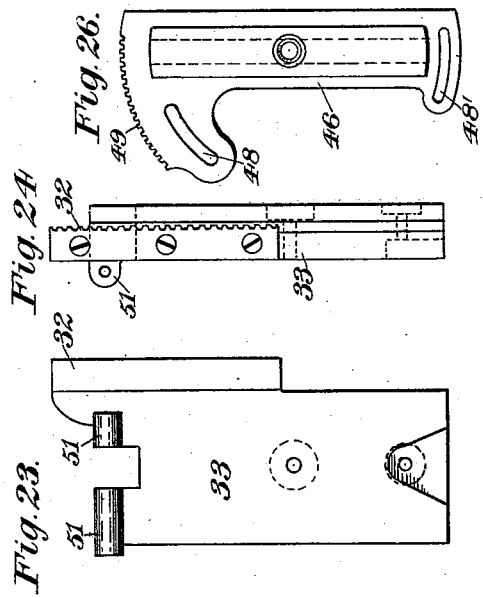
Witnesses:
J. L. Edwards Jr
Fred. J. Dole.
Inventor:
Herbert C. Warren.
By his Attorney,
F. H. Richards.

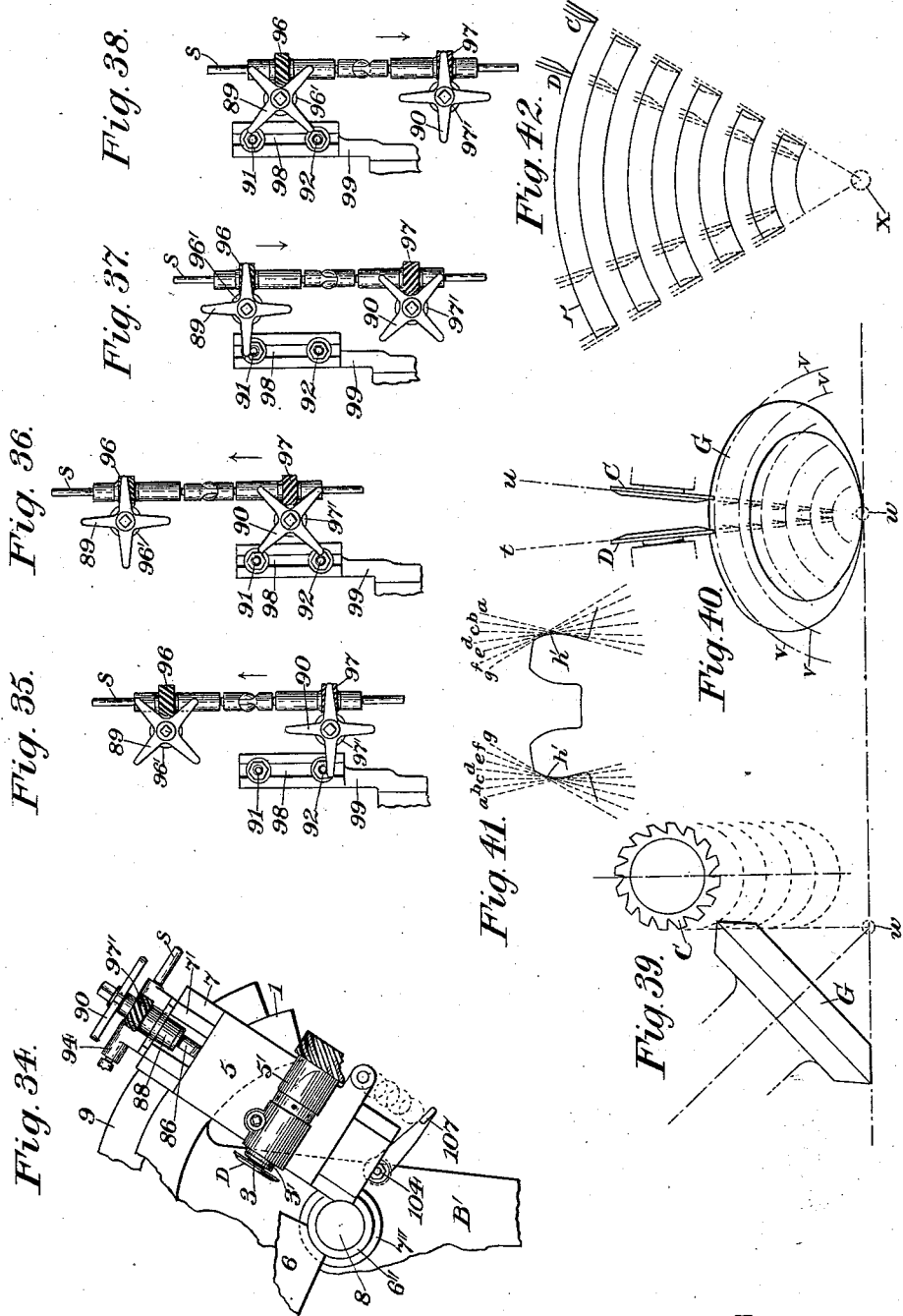

UNITED STATES PATENT OFFICE.

HERBERT C. WARREN, OF HARTFORD, CONNECTICUT.

APPARATUS FOR CUTTING GEAR-TEETH.

SPECIFICATION forming part of Letters Patent No. 547,571, dated October 8, 1895.

Application filed April 22, 1895. Serial No. 546,624. (No model.)

*To all whom it may concern:*

Be it known that I, HERBERT C. WARREN, a citizen of the United States, residing at Hartford, in the county of Hartford and State of Connecticut, have invented certain new and useful Improvements in Apparatus for Cutting Gear-Teeth, of which the following is a specification.

This invention relates to machines for generating gear-teeth of various kinds, the object of my present invention being to primarily furnish an improved apparatus or machine whereby theoretically-correct gear-teeth, and more especially radial gear-teeth, may be generated with rapidity and economy and without the use of a pattern-templet, and also to so construct and organize the different mechanisms of the apparatus or machine as to readily adapt the same for generating gear-teeth of different sizes and contours, as required for gears of different sizes and kinds.

My improved machine for generating gear-teeth in accordance with my present invention embodies a gear-blank carrier, means for rotating said gear-blank carrier to bring successive tooth-space-forming portions of the gear-blank into position to be successively acted upon by the cutter, a revoluble cutter, a cutter-carrier, means for effecting a progressive forward movement of the cutter along the tooth-forming portion of the gear-blank intermediate to said partial rotation of said blank and in a plane coinciding with the plane of the tooth-face being generated, and means for effecting simultaneous rotary reciprocating movements of the gear-blank carrier and cutter-carrier, whereby theoretically-correct gear-teeth are generated by progressive sinuous movements of the cutter, all of which will be hereinafter described, and more particularly pointed out in the claims.

Figure 2:
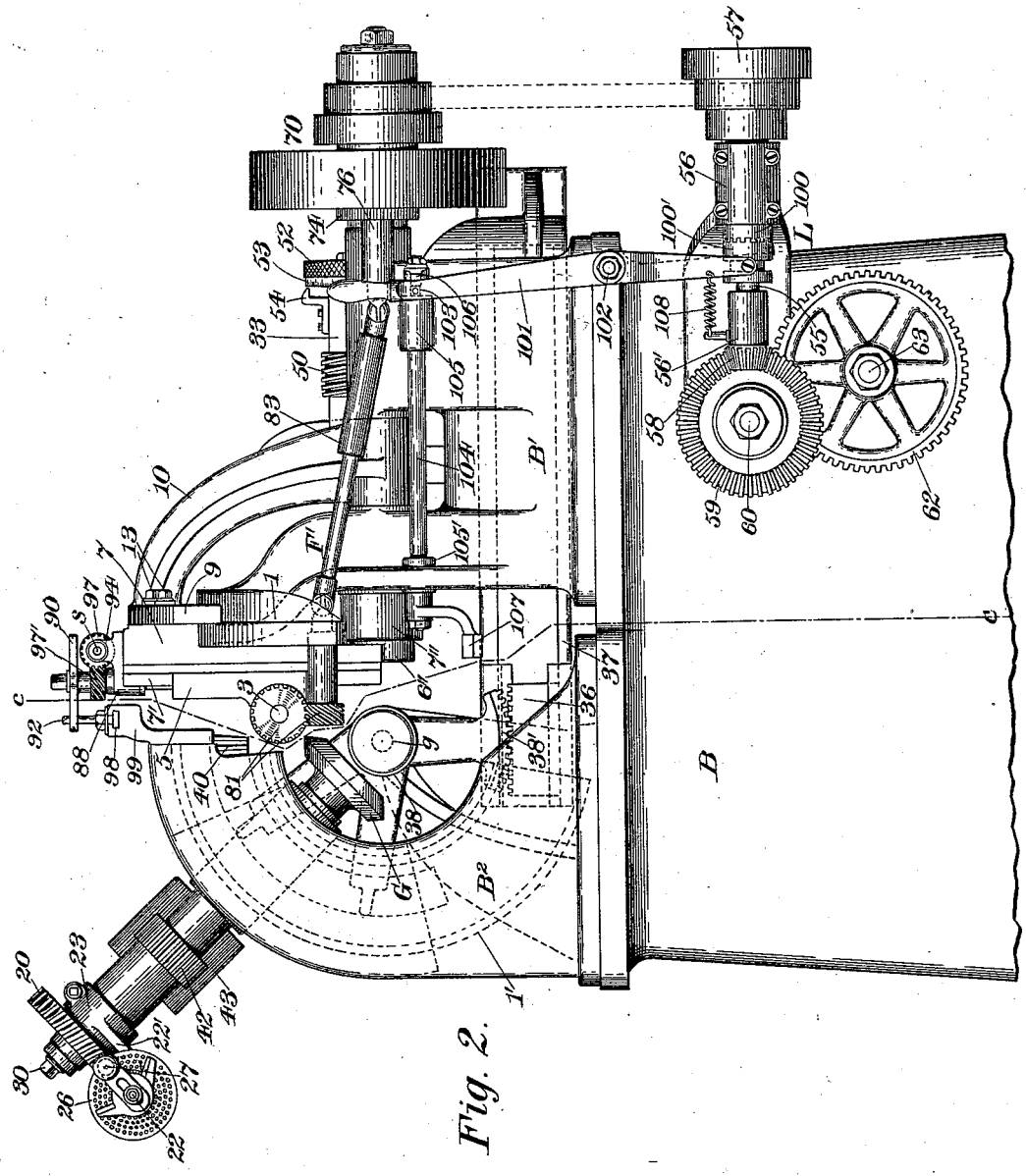

In the drawings accompanying and forming part of this specification, Figure 1 is a plan view of a machine or apparatus for generating gear-teeth in accordance with my present invention, said figure showing the gear-blank in position to be operated upon by the tooth-generating cutters. Fig. 2 is a side elevation of the machine as seen from the under side in Fig. 1, parts thereof being shown in their normal inoperative position or in the positions they occupy just preparatory to effective operations of the cutters upon the gear-blank. Fig. 3 is a view similar to Fig. 2 of the machine as seen from the upper side, Fig. 1. Fig. 4 is a vertical longitudinal section of the machine, taken in dotted line $a\,a$, Fig. 1, and looking in the direction of the arrow in said figure. Fig. 5 is a horizontal cross-section of a portion of the machine, taken in dotted line $b\,b$, Fig. 4. Fig. 6 is a transverse vertical section of the machine, taken in dotted line $c\,c$, Fig. 2, as seen from the right hand in said figure. Fig. 7 is a transverse vertical section taken in dotted line $c\,c$, Fig. 2, as seen from the left hand in said figure. Fig. 8 is a sectional side elevation, similar to Fig. 3, of a portion of the machine, showing the oscillating mechanism for the cutter-carrier and the gear-blank carrier in one extreme position thereof, the cutter-carrier and its supporting means being removed. Fig. 9 is a cross-sectional view taken in dotted line $c\,c$, Fig. 2, looking toward the left hand in said figure, and showing the cutter-carrier and co-operating parts in the position they occupy when the oscillating mechanism therefor is in the position shown in Fig. 8. Fig. 10 is a sectional side view, similar to Fig. 8, of a portion of the machine, showing the oscillating mechanism for the cutter-carrier and the gear-blank carrier in another extreme position opposite to that shown in Fig. 8. Fig. 11 is a cross-sectional view of the machine similar to that shown in Fig. 9, and showing the position occupied by the cutter-carrier when the blank-carrier is in the position shown in Fig. 10. Fig. 12 is a sectional front elevation, on a relatively large scale, of a portion of a cutter-carrier and its supporting means, said figure showing the portion of the rotating means for one of the cutters, and also showing in section the means for effecting the transverse adjustment of the cutter relatively to the cutter-slide. Fig. 13 is a longitudinal section of the parts shown in Fig. 12, taken in dotted line $d\,d$, said figure, and looking toward the left hand in said Fig. 12. Fig. 14 is a cross-sectional view of the parts shown in Fig. 12, taken in dotted line $e\,e$, and looking from the upper side in said Fig. 12. Fig. 15 is a front view of one of the cutter-slides detached. Fig. 16 is a side view of said cutter-slide. Fig. 17 is a front view of the cutter-slide carrier for the cutter-slide shown in Fig. 15. Fig. 18 is a side elevation of said cutter-slide carrier. Fig. 19 is a plan view of said cutter-slide carrier drawn in projection with Fig. 17. Fig. 20 is a horizontal cross-section of a portion of the framework of the machine and a portion of the cutter-carrier-oscillating mechanism, taken in dotted line $f\,f$, Fig. 3, and looking from the upper side in said figure. Fig. 21 is a front view of the oscillatory member of the cutter-carrier actuator, which member also constitutes a support for the cutter-carrier. Fig. 22 is an edge view of said oscillatory member as seen from the left hand in Fig. 21. Fig. 23 is a side view of the reciprocatory member of the cutter-carrier actuator, which member co-operates with the oscillatory member shown in Fig. 21. Fig. 24 is an edge view of the said reciprocatory member as seen from the right hand, Fig. 23. Fig. 25 is a plan view of said reciprocatory member drawn in projection with Fig. 23. Fig. 26 is a side view, as seen from the left hand, Fig. 9, of the transverse-bar for actuating the reciprocatory member of the blank-carrier actuator. Fig. 27 is an edge view of said transverse-bar as seen from the right hand in Fig. 26. Fig. 28 is an end view of said transverse-bar drawn in projection with Fig. 26. Figs. 29, 30, and 31 are side, end, and edge views, respectively, of the guide-block for the transverse-bar, which also constitutes a swivel connection between the transverse-bar and the reciprocatory member of the blank-carrier actuator. Figs. 32 and 33 are plan and side views, respectively, of the reciprocatory member of the blank-carrier actuator. Fig. 34 is a front view, on a relatively small scale, of a portion of the cutter-carrier and framework similar to Fig. 12, and showing the cutter-carrier in the position illustrated in Fig. 11, and also showing, by dotted circles, several successive positions of one part of the cutter-slide relatively to the tripping-plate of the automatic stopping mechanism. Figs. 35 to 38, inclusive, are operative plan views of a portion of a feeding mechanism for the cutters, showing four successive positions of the star-wheels or feed-wheels of said feed mechanism relatively to the feed-wheel actuator coinciding with the four successive positions of the cutter-carrier. Figs. 39 and 40 are side and face views, respectively, of the gear-blank, showing in full and dotted lines several successive positions of the cutters relatively to the blank during the progressively-forward movement of said cutters. Fig. 41 is a diagrammatic view illustrating the operation of generating the opposite sides of two adjacent teeth by two cutters having sinuous movements, said figure showing by dotted lines seven successive angular positions assumed by the cutters in generating a tooth-face; and Fig. 42 is a diagrammatic view illustrating the sinuous path described by the cutters in generating a tooth-face.

In generating gear-teeth in accordance with my present invention the conical gear-blank G, which will, of course, be of the requisite size for producing a finished gear-wheel of the desired size, will be intermittently and progressively advanced, rotatively, a tooth-arc distance at each movement thereof to bring the tooth-forming portions of the blank successively into position to be acted upon by the cutter, and at the completion of each intermittent rotative movement of said blank G the cutter will be fed progressively forward along the tooth-forming face of the gear-blank toward the geometrical apex of said blank G and in the plane of the tooth-face being cut, and during the progressive cutting operation of the cutter said cutter will be oscillated in a plane transverse to the axis of the said gear-blank and the gear-blank will preferably be reciprocated, rotatively, in synchronous and in a coinciding direction with the cutter to effect a rolling action of the cutter in lines transversely of the plane of the forward movement of the cutter, and thereby generate by a sinuous cutting operation a theoretically-correct tooth-face, all of which will be more fully hereinafter described.

As an instrumentality for generating gear-teeth in accordance with my present invention, I have shown in the drawings a theoretical adaptation of mechanism for automatically effecting the requisite movements of the gear-blank and cutter, the one relatively to the other, to produce theoretically-correct gear-teeth by progressive sinuous cutting operations.

In the preferred organization thereof, herein shown and described, the apparatus for generating gear-teeth embodies, in part, a rotary reciprocating or oscillating cutter-carrier, (designated in a general way by $C^2$,) and a rotary reciprocating or oscillating gear-blank carrier, (designated in a general way by $C^3$,) actuating mechanism in connection with and adapted for synchronously reciprocating the cutter-carrier and gear-blank carrier rotatively about fixed axes, respectively, which axes radiate from a common center or intersect each other. This actuating mechanism embodies a cutter-carrier actuator, a blank-carrier actuator, a synchronizing actuating-connector between said cutter-carrier actuator and blank-carrier actuator, feeding mechanism controlled by the reciprocative movements of the cutter-carrier and adapted for automatically and intermittently moving the cutter-carrier forward in the plane of the tooth being generated, and rotating and indexing mechanisms in operative connection with and adapted for controlling the movements of the gear-blank carrier, all of which will be hereinafter more fully described.

Owing to the fact that the spaces between teeth in bevel-gears are of gradually-reduced width toward the apexes thereof it is not only desirable, but it is also conducive to theoretical correctness in generating-teeth of this class, to form only one face of a gear-tooth at one time and to employ a relatively thin cutter adapted for freely passing through the narrowest part of the tooth-space, and for this purpose, and also for the purpose of facilitating the operation of generating a full complement of gear-teeth in the gear-blank and to obviate the necessity of a repetition of operations to form the opposite working faces of the successive teeth, I preferably employ, in connection with the organization of mechanism illustrated in the drawings, a plurality of tooth-face generating-cutters, (herein shown as circular milling-cutters, and two in number,) in position and adapted for generating the opposite faces of adjacent teeth, one cutter (designated by C) acting and generating one face of one tooth, and the adjacent cutter (designated by D) acting upon and generating the opposite face of the next adjacent tooth, as will be understood by reference to the diagrammatic view, Fig. 41, which illustrates the operation of generating the tooth-faces of a bevel-gear. It is desired to state in the above connection, however, that in generating parallel teeth—such, for instance, as the teeth of spur-wheels—it is practicable to form, simultaneously or substantially simultaneously, the adjacent faces of two adjacent teeth by means of a single cutter having a sinuous cutting movement. Therefore, I do not desire to limit this invention to the employment of any particular number of cutters or to the specific organization thereof shown in the drawings.

It will be understood that the employment of a plurality of cutters is simply for the purpose of facilitating the operation of forming gear-teeth, as it enables me to form a full complement of gear-teeth in a blank at substantially each complete rotation of said blank, which would not be the case if a single cutter were employed, although it may be desirable in some cases, as when generating teeth for very small gear-wheels, to employ but one cutter.

The framework of my improved machine, which framework may be of any suitable general construction adapted for carrying the operative parts, consists (in the preferred form thereof, herein shown) of a base B, a cutter-mechanism frame B', the blank-mechanism frame B², and a bracket or supplemental frame B³, for sustaining the blank-actuator. The two frames B' and B² (the frame B' of which constitutes a guiding support for the cutter-carrier and its co-operating mechanism, and the frame B² of which constitutes a guiding support for the gear-blank carrier) are herein shown, having segmental guideways 1 and 1', respectively, in rectangular disposition relatively to each other and having their geometrical axes in substantially-corresponding planes, as will be readily understood by a comparison of Figs. 1 and 2 of the drawings. The guideway 1 upon the frame B' is in the nature of a parti-circular guide-bar upon the upper end of a vertically-disposed arm of the frame B', which bar is adapted for supporting the oscillatory member of the cutter-carrier C², as shown most clearly in Figs. 12 and 13, and which will be hereinafter fully described, whereas the guideway 1' of the frame B² is shown approximately semicircular and is formed upon the side face of a correspondingly-formed upright portion of the frame B², as will be understood by reference to Figs. 4 and 6.

In the organization thereof, herein shown and described, the gear-tooth-generating mechanism embodies two rotative cutters (designated by C and D, respectively,) supported side by side for oscillatory reciprocatory movement about and concentric to a common center, which common center is represented by a dotted circle, (designated by $g$, Fig. 2,) and is represented by the horizontal dotted line $g$ $g$, Fig. 4, As a convenient means for supporting the cutters C and D, and also as a means for facilitating the adjustment of said cutters relatively to each other, said cutters are carried by spindles or arbors 2 and 3, respectively, rotatively carried in externally-screw-threaded sleeves 2' and 3', respectively, supported for longitudinal adjustment in transverse bearings 4' and 5' upon the cutter-slides 4 and 5, respectively, which slides are adjustably supported for movement transversely of the common axis $g$, and in a plane coinciding with the cutting-plane of the cutter by guideways 6' and 7' upon the cutter-slide carriers or radius bars 6 and 7, respectively.

As a convenient means for oscillating the cutters in a path concentric to their common axis $g$, and also as a convenient means for changing the relative angles of said cutters, the cutter-slide carriers or radius bars 6 and 7 are pivotally supported at their lower ends, so as to oscillate upon a common axis, which axis is herein shown as a pivot-rod 8, journaled in and extending through horizontal bearings in the frame B', and said cutter-slide carriers or radius bars are adjustably connected at their ends with a laterally-projecting curved arm or bar 9 upon the upper end of a rocking arm or oscillating member 10, which is also pivotally supported at its lower end upon the pivot-rod 8, as is clearly illustrated in Figs. 1 to 4, inclusive.

The two cutter-slides 4 and 5, the two cutter-slide carriers 6 and 7, the oscillatory member or rocking arm 10, and the direct supporting means for the cutters practically constitute the cutter-carrier in the organization of mechanism shown in the drawings; but it will be understood, however, that the term "cutter-carrier," in the broader sense thereof, as employed in the claims herein, signifies any form of cutter-carrier embodying one or more cutter-slides, and which is adapted for oscillating the cutter, in the manner herein described.

For convenience in pivotally supporting the cutter-slide carriers 6 and 7 concentrically, said carriers have at their lower adjacent corners transversely-extended pivot-bearings 6″ and 7″, respectively, one of which, as 6″, extends into the other, as 7″, and is also supported upon the pivot-rod 8, as shown most clearly in Fig. 4 of the drawings. This construction and organization enable me to adjust the cutter-slide carriers radially and independently.

As will be seen by reference to Figs. 4, 12, and 13, the cutter-slide carriers have sliding bearings at their upper edges upon the periphery of the segmental guide 1 and are held against lateral displacement by the curved bar 9 at the upper end of the oscillatory memmer 10, which has a sliding bearing against the opposite side face of the guide-bar 1, as shown in Figs. 4 and 13. This curved bar is transversely and longitudinally slotted, as shown at 12, at opposite ends thereof, to receive the lag-screws 13, which extend through said slots and adjustably secure the cutter-slide carriers to said curved bar 9.

The automatic feeding and oscillating mechanism and the rotating mechanism for the cutters will be hereinafter explicitly described.

The gear-blank carrier is in the present instance in the nature of a blank-carrier spindle 16, journaled for rotation in a cylindrical bearing or externally-screw-threaded sleeve 17, supported for longitudinal adjustment in bearings 18 and 18′ upon a blank carrier-adjusting slide 14, which slide is preferably segmental in form and is adjustably secured to the guideway 1′ of the blank-mechanism frame B² by means of bolts 14′, extending through a substantially semicircular slot in and concentric to the substantially semicircular guideway 1′ of the frame.

As a means for adjusting the sleeve 17, together with the blank-carrying spindle 16, radially to move the blank G toward or from the cutters C D, a nut 19 is fitted to the screw-threaded sleeve 17, preferably between the adjacent ends of the bearings 18 and 18′, and by turning said nut the requisite radial adjustment of the blank-carrying spindle is effected, as will be readily understood by reference to Fig. 4 of the drawings.

As a convenient means for intermittently rotating the blank-carrying spindle 16 and for registering the blank carried thereby, said spindle is preferably provided at the outer end thereof with a worm-wheel 20, which meshes with and is rotated by a worm 21, whose shaft 22 is journaled in bearings 22′ upon a bracket 23, fixedly clamped upon an oscillatory member 24 upon the blank-carrying spindle 16, the worm 21 being preferably rotated by hand through the medium of the rotative member of a registering device, (designated in a general way by R,) which registering device will usually consist of a fixed perforated registering-plate 26 and a register-pin 27, adapted for entering the holes of the registering-plate, and which pin is carried by the shaft of the worm 21.

It will be obvious that any suitable registering device may be employed in connection with the rotating means of the blank-carrying spindle 16.

As a convenient means for centering and for securely holding the blank G in place in the spindle 16, said spindle is longitudinally bored from end to end, and is conically tapered at the inner end of said bore, as shown at 28, to receive the correspondingly-tapered hub 29 of the blank G, which hub is axially bored and internally screw-threaded to receive the screw-threaded inner end of a bolt 30, the outer headed end of which bolt bears against the outer end of the spindle 16, as will be understood by reference to Fig. 4 of the drawings. This means for centering and holding the blank relatively to the spindle may of course be modified within the scope and limits of my invention.

In the organization of mechanism herein shown and described, and as will be seen by reference to Figs. 4 and 6 of the drawings, the blank-carrying spindle is adapted for adjustment in the arc of a circle about a geometrical axis, which lies at the point of intersection of the axial line of the spindle 16 and the axial line of the pivot-rod 8, about which the cutters oscillate. This enables a change to be made in the angle of the axis of the blank-carrying spindle relatively to the cutting-plane of the cutters C D, as is necessary to adapt the machine for generating the different kinds of gear-teeth, and the blank-carrying spindle and cutter-carrier are adapted for synchronous oscillations or rotary reciprocations transversely of the longitudinal axis of the blank-carrying spindle, as will be hereinafter more fully described.

As a convenient means for synchronously oscillating or rotatively reciprocating the cutter-carrier and blank-carrier, also for securing comparative movements of relatively-varying velocities and of a predetermined ratio between said cutter-carrier and blank-carrier, and also as a means for arbitrarily changing the ratio on movements between the cutter-carrier and blank-carrier with precision, to facilitate the generation of different forms and sizes of gear-teeth, I preferably employ a cutter-carrier actuator in practically direct operative connection with the cutter-carrier, a blank-carrier actuator in operative connection with the blank-carrier, and a synchronizing actuating-connector between and operatively connecting the cutter-carrier actuator and the blank-carrier actuator and adapted, through operative mechanism hereinafter described, for effecting synchronous movements of and also adapted for effecting a change in the relative velocities of said two actuators. The cutter-carrier actuator in the preferred form thereof herein shown comprises a vertically-oscillating sector or segmental gear 31, which constitutes a part of the oscillatory member 10 of the cutter-carrier and a vertically-reciprocating rack 32, the teeth of which mesh with the teeth of the sector. This preferably constitutes a part of a slide 33, supported for sliding movement in a guideway 34 upon a bracket 35, which bracket is a member of the cutter-mechanism frame B′, said slide being held against lateral movement by gibs in the usual manner.

The blank-carrier actuator in the preferred form thereof herein shown comprises a reciprocatory rack 36, supported in a horizontal slideway 37, which constitutes a part of the framework of the machine, said rack 36 having a movement at right angles to and at one side of the reciprocating rack 32 of the cutter-carrier actuator, an oscillatory member 38, supported for oscillatory movement upon a stud 29 upon the bracket or supplemental frame B³, and having a sector or segmental gear 38′, whose teeth mesh with the teeth of the reciprocating rack 36, an oppositely-disposed segmental rack or sector 40 in position and adapted for meshing with and oscillating a gear which constitutes one member of a power-transmitter, intermediate to and operatively connecting the oscillatory member 38 and the gear-blank carrier, and a power-transmitter intermediate to the oscillatory member and the blank-carrier, which consists of a shaft 41, journaled in a bearing upon the frame B², a driven gear upon said shaft in mesh with the segmental rack 40, a pinion 42 in fixed connection with the cylindrical bearing or sleeve 17, in which the gear-blank spindle is journaled, and a driving-gear 43, carried by the shaft 41 and meshing with the pinion 42, which driving-gear is of such width as to maintain an operative engagement with the pinion, and at the same time provide for adjustment of said pinion relatively to the driving-gear.

The actuating-connector, between the cutter-carrier actuator and the blank-carrier actuator, consists, in the form thereof herein shown, of a guide-block 45, pivotally carried by the reciprocatory rack 36 of the blank-carrier actuator, and a traverse-bar 46, having a sliding bearing in the pivotal guide-block 45, and pivoted approximately midway of its length, as at 46′, upon the slide 33 of the cutter-carrier actuator, said guide-block and traverse-bar practically constituting a shiftable connection between the rack 36 of the blank-carrier actuator and the rack 32 of the cutter-carrier actuator, and controlling the relative movement of said actuators. This traverse-bar, in its co-operation with the guide-block 45, acts as a sliding cam to reciprocate the rack 36 of the blank-carrier actuator in synchronism with reciprocation of the rack 32 of the cutter-carrier actuator.

As a convenient means for changing the inclination of the traverse-bar relatively to the plane of movement of the reciprocatory rack 36 of the blank-carrier actuator, to increase or decrease the throw of said actuator, as may be required, to secure the requisite relative movements of the blank-carrier actuator and the cutter-carrier actuator, said traverse-bar is adjustably secured, at opposite ends thereof, to the slide 33 of the cutter-carrier actuator by means of bolts 47 and 47′, which extend through elongated slots 48 and 48′, which are concentric to the pivotal point 46′ of said bar, as will be readily understood by reference to Figs. 8 and 10 of the drawings, and as a means for securing extreme precision in the adjustment of the traverse-bar and for indicating the position of said bar the periphery of one end of said bar is toothed or is in the nature of a segmental worm-wheel, as shown at 49, and a worm 50 is provided, which meshes and is adapted for rotatively moving said bar to effect the requisite adjustment thereof. The worm 50 has its shaft journaled in bearings 51 upon the slide 33, and carries, at the outer end thereof, a hand-wheel 52, by means of which said worm may be rotated, and also carries a dial 53, which is adapted for co-actuating with a pointer 54 on said slide to indicate the position of the traverse-bar.

The reciprocating mechanism for the slide 33, which mechanism may be of any suitable organization for imparting the requisite throw to the slide at the desired velocity, consists, in the form thereof herein shown, of a driven shaft 55, journaled in suitable bearings 56 and 56′ upon the base B of the machine and carrying a driven pulley 57 at one end thereof, which pulley 57 is driven through a belt, (shown in dotted lines,) extending over a driving-pulley 70, revolubly carried upon a supporting member on the frame B′, concentric to the pivot-bolt 8; a bevel-gear 58, carried at the opposite end of the driven shaft; a bevel-gear 59, meshing with the bevel-gear 58 and having a shaft 60 thereof journaled in suitable bearings in the side walls of the base B; a gear-wheel 61, carried upon the shaft 60; a spur-wheel 62, meshing with the gear-wheel 61 and having its shaft 63 journaled in suitable bearings in the base B; a wheel 64, carried at the end of the shaft 63 below the traverse-bar-carrying slide 33, and a pitman or connecting-rod 65, pivotally connected at one end to the lower end of the slide 33 and pivotally and adjustably connected at its opposite end to the face of the wheel 64, as will be readily understood by reference to Figs. 1, 2, and 3 of the drawings.

The rotating mechanism for the cutters C and D, in the preferred form thereof herein shown, consists of the driving-pulley 70, having the hub 70′, supported upon a cylindrical carrier 71, carried at the outer end of the pivot-rod 8 concentric thereto, as more clearly illustrated in Figs. 1 and 4; a gear-wheel 72, carried by the hub of the driving-pulley 70; two similar gear-wheels 73 and 74, having shafts 73′ and 74′, respectively, journaled at opposite sides, respectively, of the axis of the gear-wheel 72 in bearings 75 and 76; two relatively-short shafts 78 and 78', journaled in horizontal alignment in suitable bearings 79 and 79' at opposite sides of the cutter-carrying slides 4 and 5, respectively, which shafts 78 and 78' are operatively connected with the two cutter-carrying arbors 2 and 3, respectively, preferably by means of two pairs of spiral gears 80 and 81, respectively, the two upper gears of the two pairs of gears being carried by the two cutter-arbors 2 and 3, and the two lower gears being carried by the shafts 78 and 78', and two telescopic universal connections 82 and 83, one of which, as 82, forms a universal connection between the two shafts 73' and 78, and the other of which, as 83, forms a universal connection between the shafts 74' and the shaft 78'. These telescopic and universal connectors 82 and 83, together with the relatively-short shafts 73' and 78 and 74' and 78' will, for convenience, be herein referred to as "flexible" shafts, and as a whole will be designated in a general way by F and F', respectively.

It will be obvious that other forms of flexible driving means for the cutters C and D may be employed without departing from my invention—as, for instance, the well-known Morse flexible shafting may be practically used in lieu of the telescopic universal shafting shown in the drawings, as it is simply necessary to employ driving means, which will accommodate itself during operation to the various positions assumed by the cutters and cutter-slides.

As a convenient means for intermittently and automatically feeding the cutters C and D progressively forward along the tooth-forming face of the blank, toward the apex of said blank, the cutter-slides 4 and 5 are furnished with feed-screws 85 and 86, respectively, which have screw-threaded bearings in the cutter-slides, and are rotatably supported at their upper ends in the bearings 87 and 88 upon the slide-carrying radius-bars 6 and 7, respectively, which screws are intermittently rotated through the medium of star-wheels 89 and 90, carried at the upper ends of the screws 85 and 86, respectively, which star-wheels are in position and adapted during successive operations of the cutter-carrier for alternately engaging abutments 91 and 92, respectively, carried at the upper end of the blank-mechanism frame B², which abutments are projected into the path of movement of the arms of the star-wheels, and are adapted for effecting a partial rotation of the feed-screws 85 and 86 alternately at each throw or movement of the cutter-carrier, as will be understood by reference to Figs. 1 and 3 and Figs. 35 to 38, inclusive, said Figs. 35 to 38, inclusive, showing four successive positions of the star-wheels relatively to the abutments through which they are rotated.

As a means for simultaneously rotating the two feed-screws of the cutter-slides at each partial rotation of one or the other star-wheels, and at the same time provide for lateral adjustment of the cutter-carrier slides relatively to each other, said feed-screws are operatively connected for synchronous movements, preferably by means of a universal shaft $s$, having a sliding fit at opposite ends, and bearings 93 and 94 upon the two slide radius bars or slide-carriers 6 and 7, and carrying spiral gears 96 and 97 at opposite ends thereof, which mesh with similar spiral gears 96' and 97' upon the upper ends of the screws 85 and 86, respectively, said gears 96 and 97 being preferably splined to the shaft $s$ intermediate to the two parts of the bearings 93 and 94, as will be seen by reference to Figs. 12 and 13.

The abutments 91 and 92, which co-operate with the star-wheels or feed-wheels 89 and 90, are herein shown in the nature of pins adjustably secured in a T-shaped guide-slot 98, formed in the upper face of the bracket 99, which constitutes a part of the blank-mechanism frame B², as clearly shown in Figs. 1 and 2 of the drawings.

By the construction and organization of mechanism herein shown and described it will be seen that the cutters C and D are constantly rotated during the synchronous oscillations of the cutter-carrier and the blank-carrier, and at each semioscillation, or at each stroke of the cutter-carrier, the cutters will be simultaneously and automatically advanced an arbitrary distance relatively to the gear-blank through the medium of the feed device hereinbefore described, as will be readily understood by a comparison of the several figures of the drawings.

As a convenient means for automatically stopping the oscillatory and the advancing movements of the cutters immediately after the completion of the working stroke of said cutters, I have provided, in connection with the actuating mechanism for the oscillating cutter-carrier, an automatically-operable stopping device controlled by the advancing movement of the cutter-slide, which stopping device embodies a clutch device (designated in a general way by L) and an automatically-operable shifting device in operative connection with said clutch device. This stopping device, in the specific organization thereof herein shown and described, consists of the two gear-toothed clutch members 100 and 100', one of which is carried by the hub of the driven pulley 57, and the other of which is carried by the shaft 55; a spring retracted shifting lever 101, fulcrumed at 102 upon the base B of the machine and having a catch 103 at the upper end thereof; a rocking shifting-lever actuator 104, which is shown in the nature of a rock-shaft, journaled in bearings 105 and 105' upon the cutter-mechanism frame B', and having a locking-arm 106 at one end thereof, in position and adapted for engaging a catch 103 upon and for normally holding the lever in the position it occupies when the clutch members are in operative engagement with each other, and said shaft also having at the opposite end thereof an oppositely-disposed tripping-arm 107, whose outer end lies in the path of movement of one of the cutter-slides and is adapted to be partially rotated by said cutter-slide at a predetermined point in the advancing movement of the cutter, to thereby throw the locking-arm out of engagement with the catch upon the shifting-lever, which allows the retracting-spring 108, which has one of its ends connected with the lower end of said lever and has its other end connected to a fixture upon the base B, to retract the lever, which throws the two clutch members out of engagement with each other and allows the driven pulley 57 to run loose, thus immediately stopping the operation of the cutter-carrier actuating mechanism and thereby stopping the oscillatory movement of the cutters and also the advancing movement of said cutters, as will be readily understood by reference to Figs. 1, 2, and 34 of the drawings.

As a means for facilitating the accurate adjustments of the two cutter-slide carriers relatively to each other, and for indicating the degree of angle of said cutter-slide carriers relatively to the axis of the gear-blank carrier, or relatively to the vertical line intersecting the axis of rotation of the cutter-carrier, the curved bar 9 of the oscillatory member 10, to which the slide-carrying radius-bars 6 and 7 are adjustably secured, is furnished with a protractor or indicator, as shown at 109, at the periphery thereof, adapted to coact with marks or pointers upon the cutter-slide carriers for indicating the degree of inclination of the cutting-faces of the cutters relatively to the axial plane of the blank-carrier, as will be understood by reference to Figs. 1 and 7 of the drawings. In practice, the guideway 1' for the gear-blank-carrier slide will also be furnished with a protractor, as shown at 110, adapted to coact with a fixed point herein shown as the end face upon the blank-carrier slide for indicating the degree of inclination of the blank-carrier relatively to the advancing path of movement of the cutters, as will be understood by reference to Fig. 1 of the drawings.

By the employment of the peculiarly constructed and organized devices herein shown and described in connection with the cutter-carrier, blank-carrier, and with the cutter-carrier and blank-carrier actuators it will be seen that the synchronous oscillatory movements of said cutter-carrier and blank-carrier may be regulated with extreme precision to secure the utmost accuracy in co-operation, and that the throw of the cutter-carrier and blank-carrier may be readily increased or decreased within certain limits to accommodate the machine to the formation of various sizes of gear-teeth; also, that the degree of inclination of the tooth-generating cutter may be quickly changed relatively to the axial plane of the gear-blank carrier to adapt the cutter for generating teeth of different widths; also, that the degree of inclination of the gear-blank carrier may be quickly changed relatively to the advancing path of movement of the cutters, as is necessary in operating upon different-sized gear-blanks, and also that the intermittent advancing movement of said cutters may be readily increased or decreased, as required.

In generating a bevel-gear tooth by the improved machine herein shown and described, (assuming the parts of the machine to be in a position illustrated in Figs. 1, 2, 3, and 4,) upon the inauguration of the movements of the several mechanisms the blank G, together with the cutters C and D, will be reciprocated, rotatively and synchronously, in substantially corresponding directions, but usually at relatively varying velocities, and at each stroke of the cutter-carrier the cutters will receive an advancing impulse in a direction transverse of the axis of the blank carrier and toward the geometrical apex of the gear-blank G. The cutters, owing to their oscillatory and intermittently-advancing movements, will describe a sinuous path during their cutting operations over the tooth-forming face of the blank, which path of movement of the cutters is represented by the continuous sinuous line $p$ in Fig. 42 of the drawings, which figure is a diagrammatic view, illustrating the sinuous cutting movements of the cutters, and clearly shows the gradual decrease in the throw of the successive oscillatory movements of the cutters as they advance toward the geometrical apex of the gear-blank, which apex is represented by the dotted circle $x$ in said figure. During this sinuous cutting movement the cutting-face of one cutter, as C, (which cutter preferably has a V-shaped cutting-edge,) assumes the successive angular positions represented by lines $a\ b\ c\ d\ e\ f\ g$, Fig. 41 of the drawings, relatively to the face $h'$ of the tooth being generated, which change in the positions of the cutter relatively to the tooth-face is effected by the oscillations of the gear-blank and cutter, which causes a rolling motion of the cutter relatively to the tooth being generated and produces a theoretically-correct tooth-face. Thus it will be seen that, contrary to the usual method of cutting a tooth-face by successive cutting operations, a tooth-face is generated by a continuous movement of the cutter in a sinuous path, the oscillations of the cutter and the change in the angular positions of said cutter relatively to the tooth being generated generating a theoretically-correct curve for the working-face of the tooth.

In Figs. 39 and 40 the cutters C and D are shown in full and dotted lines in five successive positions assumed by said cutters relatively to the blank G, the radial dotted lines $t$ and $u$, Fig. 40, representing the radial paths of movements of the cutters C and C' toward the apex of the blank, the segmental dotted lines $v$ representing the successive transverse or oscillatory paths of movement of said cutters, and the dotted circle $w$ representing the oscillatory path described by the pitch-line of the blank G synchronously with the oscillatory movement of the cutters C and D.

In referring to the organization of tooth-generating cutters shown and described, it is desired to state that while it is preferable, especially when generating the teeth of very small gear, to employ two rotary cutters, so disposed relatively to each other and relatively to the gear-blank being cut as to simultaneously generate the opposite faces of two adjacent teeth, one of said cutters generating one face of one tooth and the other of said cutters generating the opposite face of the next adjacent tooth, the two cutters may be so disposed, relatively, as to generate the opposite faces of the same tooth, which will sometimes be desirable when generating the teeth of relatively large gears. It will therefore be understood that I do not limit myself to the employment of any particular number of cutters or to any particular relative disposition thereof, as one or more cutters may be employed within the scope and limits of my invention.

Having thus described my invention, what I claim is—

1. In a machine for generating gear-teeth, a rotary-reciprocating gear-blank carrier; and means for automatically actuating said gear-blank carrier; in combination with a rotary-reciprocating cutter-tool carrier; and means for imparting rotary reciprocating movements to said cutter-carrier in a path transversely of the longitudinal axis of and in synchronism with said gear-blank carrier, substantially as described.

2. In a machine for generating gear-teeth, in combination, a gear-blank carrier and a cutting-tool carrier operatively connected for synchronous rotary-reciprocating movements, relatively, about a common center; and means for imparting rotary-reciprocating movements to said carriers, synchronously, substantially as described.

3. In a machine for generating gear-teeth, in combination, a gear-blank carrier supported for rotary-reciprocating movements about its axis; a cutter-carrier supported for rotary reciprocating movements in a direction coinciding with the direction of movement of the gear-blank carrier; a rotary-cutter carried by said cutter-carrier in position and adapted for acting upon the gear-blank carried by the blank-carrier; and mechanism for actuating said parts synchronously, substantially as described.

4. In a machine for generating gear-teeth, in combination, a gear-blank carrier; mechanism for imparting to said carrier rotary-reciprocating movements about its axis; a cutter-carrier; and synchronizing actuating mechanism operatively connecting the gear-blank carrier and cutter-carrier, and adapted for imparting rotary-reciprocating movements to the cutter-carrier transversely of the axis of the gear-blank carrier, and also for effecting synchronous movements of said cutter-blank carrier and gear-blank carrier, substantially as described.

5. In a machine for generating gear-teeth, a gear-blank carrier, and a cutter-carrier, in combination with an actuating-connector between, and adapted for effecting a synchronous oscillating movement of, said gear-blank carrier and cutter-carrier, substantially as described, and for the purpose set forth.

6. In a machine for generating gear-teeth, the combination of an oscillatory gear-blank carrier; an oscillatory cutter-carrier; and carrier-actuating means in operative connection with, and simultaneously imparting oscillatory movements to, said gear-blank carrier and cutter-carrier in relatively-coinciding directions.

7. In a machine for generating gear-teeth, in combination, an oscillatory gear-blank carrier; an oscillatory cutter-carrier; and means in operative connection with, and adapted for imparting oscillatory movements of relatively-varying velocities to, said gear-blank carrier and cutter-carrier, synchronously.

8. In a machine of the class specified, the combination with a rotary-reciprocating blank-carrier; and with means for automatically imparting rotary-reciprocating movements to said blank-carrier; of a rotary-cutter supported for oscillatory movement; and means for imparting rotating and advancing movements to the cutter in the plane of its cutting-edge; and means for imparting oscillatory movements to said cutter in synchronism with the rotary-reciprocating movements of the blank-carrier, substantially as described, and for the purpose set forth.

9. In a machine of the class specified, in combination, a blank-carrier and a cutter-carrier operatively connected for synchronous oscillatory movements about axes radiating from a common center; a rotary-cutter carried by the cutter-carrier; and actuating mechanism in connection with, and adapted for synchronously and automatically imparting oscillatory movements to the blank-carrier and cutter-carrier; and means for rotating the cutter and advancing said cutter toward the center from which the axes of said blank-carrier and cutter-carrier radiate, substantially as described, and for the purpose set forth.

10. In a machine for generating gear-teeth, in combination, a blank-carrying spindle; actuating mechanism for automatically imparting rotary-reciprocating movements to said spindle; a cutter-carrier; means for oscillating said cutter-carrier in a plane transversely of the axes of, and in synchronism with, and in a direction corresponding to the direction of movement of, the blank-carrying spindle; a rotary-cutter movably carried by said cutter-carrier; and cutter-carrier rotating and feeding means for rotating said cutter-carrier, and for imparting advancing movement thereto, in a plane intersecting the axial plane of said spindle, substantially as described, and for the purpose set forth.

11. In a machine of the class specified, the combination of an oscillatory gear-blank carrier; a rotary-cutter supported for oscillatory movement; actuating means connecting the gear-blank carrier and cutter, and adapted for imparting oscillatory movements to the gear-blank carrier, and for simultaneously imparting to the cutter a progressive cutting movement in a sinuous path transversely of the axial line of the blank-carrier, substantially as described, and for the purpose set forth.

12. In a machine for generating gear-teeth, in combination, a gear-blank carrier adapted for rotary-reciprocating movements about its axis; actuating mechanism for said gear-blank carrier; a rotary-cutter supported and adapted for intermittent advancing movements in a plane intersecting the axial plane of the blank-carrier; cutter-actuating mechanism co-operating with the blank-carrier-actuating mechanism for effecting synchronous operations of said two actuating mechanisms; and means for intermittently advancing the cutter along the blank carried by the blank-carrier in a plane corresponding to the longitudinal plane of the face of the tooth being generated, and also for oscillating the cutter in a plane substantially concentric to the axis of the blank-carrier, and transversely of the tooth being generated, substantially as described.

13. In a machine for generating bevel-gear teeth, in combination, a gear-blank carrier supported for rotary-reciprocating movements about its axis; a rotary-cutter supported for intermittent advancing movement in a plane intersecting the axial plane of the blank-carrier, and also for transverse and rotary-reciprocating movements; cutter-feeding mechanism in connection with and adapted for advancing the cutter along the blank carried by the blank-carrier; and synchronizing actuating mechanism co-operatively connecting the blank-carrier and cutter, and adapted for synchronously imparting rotary-reciprocating movements to the blank-carrier and cutter in corresponding directions, substantially as described, and for the purpose set forth.

14. In a machine for generating gear-teeth, the combination with the oscillatory gear-blank carrier and its actuating mechanism; of a rotary tooth-generating cutter in position and adapted for acting upon the gear-blank carried by the blank-carrier; and cutter-controlling mechanism, substantially as described, in operative connection with the cutter and with the gear-blank-actuating mechanism, and adapted for moving the cutter progressively forward along the tooth-forming face of the gear-blank in a plane corresponding to the longitudinal plane of the gear-tooth, and for oscillating said cutter transversely of the longitudinal plane of the gear-tooth in synchronism with the oscillatory movement of the gear-blank carrier, substantially as described, and for the purpose set forth.

15. In a machine for generating gear-teeth, in combination, an oscillatory holder for the gear-blank; registering mechanism carried by the gear-blank holder, and adapted for intermittently rotating the blank-holder an aliquot part of a complete rotation; a tooth-generating cutter supported for rotary and transverse oscillatory movements; and gear-blank and cutter actuating and controlling mechanism, substantially as described, co-operatively connecting the blank-carrier and cutter and adapted for synchronously oscillating said blank-carrier and cutter in coinciding directions and in substantially-concentric planes; and means for moving the cutter progressively along the tooth-forming face of the gear-blank, during the oscillatory movement of said cutter, substantially as described.

16. In a machine for generating gear-teeth, an oscillatory gear-blank carrier; a rotary-cutter; an oscillatory cutter-carrier; an actuating-connector between the gear-blank carrier and cutter carrier, and adapted for synchronously oscillating the gear-blank and cutter in coinciding directions, and in planes substantially concentric to a common center; and means for rotating and advancing the cutter relatively to the gear-blank, substantially as described, and for the purpose set forth.

17. In a machine for generating bevel-gear teeth, in combination, a gear-blank carrier supported for rotary-reciprocating movements about its axis; a rotary-cutter supported for intermittent advancing movements in a plane intersecting the axial plane of the blank-carrier, and also for transverse and rotary-reciprocating movements; cutter-feeding mechanism in connection with and adapted for advancing the cutter along the blank carried by the blank-carrier; and synchronizing actuating mechanism co-operatively connecting the blank-carrier and cutter, and adapted for synchronously imparting rotary-reciprocating movements of relatively-varying velocities to the blank-carrier and cutter in corresponding directions, substantially as described, and for the purpose set forth.

18. In a machine for generating gear-teeth, the combination of an oscillatory gear-blank carrier; and an oscillatory cutter-carrier slide both supported for radial movements, relatively to a common center; and means substantially as described, for simultaneously oscillating the gear-blank carrier and cutter-slide carrier about said common center, and for moving said blank-carrier and cutter-slide carrier radially of said common center for the purpose set forth.

19. In a machine for generating gear-teeth, the combination with an intermittently-rotative gear-blank carrier; and with means for intermittently rotating said gear-blank carrier; of a cutter-slide carrier supported for oscillatory movements transversely of the gear-blank carrier, and having a cutter-slide supported for radial movements, relatively to the axis of the cutter-slide carrier; oscillating mechanism operatively connecting the blank-carrier and cutter-slide carrier, and adapted for synchronously oscillating said carriers in corresponding directions, and actuating mechanism, substantially as described, in position and adapted for intermittently imparting an advancing movement to the cutter-slide, substantially as described and for the purpose set forth.

20. In a machine for generating bevel-gear teeth, in combination; a cutter-slide carrier, and a gear-blank carrier supported for synchronous oscillatory movements about intersecting axes; and means in operative connection with, and adapted for synchronously oscillating, said cutter-carrier and blank-carrier, substantially as described, and for the purpose set forth.

21. In a machine of the class specified, an oscillatory blank-carrier and an oscillatory cutter-carrier supported with their axes radiating from a common center, and adapted for radial and substantially-concentric adjustments relatively to the common center, from which the axes of said carriers radiate, and for synchronous oscillatory movements; in combination with independent adjusting means for the blank-carrier and for the cutter-carrier, and adapted for independently adjusting said carriers concentrically of, and toward and from, said common center; and actuating mechanism operatively connecting said carriers and adapted for synchronously oscillating said carriers in corresponding directions, and at relatively-different velocities, substantially as described, and for the purpose set forth.

22. In a machine for generating gear-teeth, in combination, a cutter-carrier supported for oscillatory movements about a fixed axis; a rotating cutter supported for movement radially of the axis of said carrier; means for oscillating said cutter-carrier; and an oscillatory gear-blank carrier supported for radial and concentric adjustments, relatively to an axis having an arbitrarily-fixed relation to the axis of the cutter-carrier; and means for automatically oscillating the gear-blank carrier in synchronism with, and in a direction corresponding to the direction of movement of, the cutter-carrier, substantially as described, and for the purpose set forth.

23. In a machine for generating gear-teeth, the combination with the cutter-slide carrier supported for oscillatory movement about a relatively-fixed axis, and with the cutter-slide and the rotating-cutter supported for radial movement, relatively to the axis of said cutter-slide carrier; of a gear-blank carrier supported for angular adjustment, relatively to the axis of the cutter-slide carrier, and adapted for oscillatory movement about said axis; and two co-operating actuators operatively connected together for synchronous movement, and one of which is operatively connected with, and is adapted for oscillating, the cutter-slide carrier, and the other of which is operatively connected with, and is adapted for oscillating, the gear-blank carrier, substantially as described, and for the purpose set forth.

24. In a machine for generating gear-teeth, in combination, a gear-blank carrier and a cutter-carrier supported for oscillatory movements about a common center; a rotative cutter movably carried by the cutter-carrier with its periphery in a plane radial to the axis of the gear-blank carrier, and adapted for movement toward and from said common center; means in connection with and adapted for moving said cutter toward and from said common center; and means for oscillating the cutter-carrier and gear-blank carrier in synchronism, substantially as described, and for the purpose set forth.

25. In a machine of the class specified, in combination, a gear-blank carrier supported for oscillatory movements about a relatively-fixed axis; a cutter-carrier supported for oscillatory movement about a relatively-fixed axis; means for oscillating said carriers in synchronism and in coinciding directions and with relatively-varying velocities; a pair of rotative cutters supported by the cutter-carrier with their peripheries in planes radial to a common axis, and operatively connected for angular adjustment relatively to, and transversely of, each other; and means for adjusting said cutters relatively to each other, substantially as described.

26. In a machine for generating gear-teeth, the combination with the oscillatory gear-blank carrier and oscillatory cutter-carrier; and with actuating mechanism for imparting comparative movements of relatively-varying velocities to said blank-carrier and cutter-carrier; of adjusting mechanism for effecting a change in the relative velocities of said blank-carrier and cutter, substantially as described.

27. In a machine of the class specified, in combination, a gear-blank carrier supported for rotary-reciprocating movements; an actuator in operative connection with said blank-carriers; a cutter-carrier supported for oscillatory movement about a relatively-fixed axis; an actuator in operative connection with the cutter-carrier; a synchronizing connector between, and operatively connecting, the cutter-carrier actuator and the blank-carrier actuator; a rotative-cutter adapted for movement transversely of the blank-carrier; and actuating mechanism in operative connection with the cutter-carrier actuator and blank-carrier actuator, and adapted for rotating the cutter and for simultaneously actuating the cutter-carrier and blank-carrier, substantially as described, and for the purpose set forth.

28. In a machine for generating gear-teeth, in combination, a gear-blank carrier supported for oscillatory movement; a cutter-carrier embodying an oscillatory member, supported for oscillatory movement in a path transversely of the axial line of the blank-carrier; and a cutter-carrier supported by the oscillatory member for movement transversely of the path of movement of said member; actuating mechanism connected and adapted for automatically oscillating said cutter-carrier and blank-carrier in synchronism; a cutter-slide-actuating device controlled by the oscillatory movement of the cutter-carrier, and adapted for automatically advancing said cutter-slide, toward and from the axial line of the cutter-carrier, substantially as described.

29. In a machine for generating gear-teeth, the combination with the gear-blank carrier and with means for automatically oscillating said carrier; of an oscillatory cutter-carrier in operative connection with the gear-blank carrier, and comprising a cutter-slide-carrying member supported for oscillatory movements transversely of the axis of the blank-carrier; a radially-disposed cutter-slide supported on said cutter-slide-carrying member for adjustment in a plane corresponding with the path of movement of said cutter-slide-carrying member, and also supported for reciprocatory movement in plane transversely of the path of movement of said carrying member; and means for simultaneously oscillating the carrying member, and advancing the cutter-slide in synchronism with the oscillatory movement of the blank-carrier, substantially as described, and for the purpose set forth.

30. In a machine for generating gear-teeth, in combination, a gear-blank carrier; a cutter-carrier; means for imparting comparative oscillatory movements to said blank-carrier and cutter-carrier, synchronously; and adjusting means for changing the relative velocities of said gear-blank carrier and cutter-carrier, substantially as described.

31. In a machine for generating gear-teeth, a blank-carrier and a cutter-carrier operatively connected for synchronous rotary-reciprocating movements about axes radiating from a common center; in combination with mechanism for simultanously actuating said carriers; and with means for changing the range of movement of one carrier relatively to that of the other carrier, substantially as described.

32. In a machine for generating gear-teeth, a gear-blank carrier, and a cutter-carrier operatively connected together for synchronous rotary-reciprocating movements about a center common to both; in combination with actuating mechanism operatively connecting and simultaneously imparting comparative rotary-reciprocating movements of relatively-varying velocities to said gear-blank carrier and cutter-carrier in synchronism; and adjusting means in connection with said actuating mechanism and adapted for effecting a change in the relative velocities of said gear-blank carrier and cutter-carrier, substantially as described.

33. In a machine for generating gear-teeth, in combination, an oscillatory gear-blank carrier; an oscillatory cutter-carrier; actuating mechanism in connection with, and adapted for synchronously imparting comparative oscillatory movements of relatively-varying velocities to said gear-blank carrier and cutter-carrier; and an adjusting device in connection with said actuating mechanism, and adapted for effecting a change in the velocity of one carrier relatively to that of the other carrier, substantially as described.

34. In a machine for generating gear-teeth, in combination, an oscillatory gear-blank carrier; an oscillatory cutter-carrier; a gear-blank-carrier actuator; a cutter-carrier actuator; means in connection with, and adapted for imparting comparative movements of relatively-varying velocities to said actuators; and an adjusting device in connection with said actuators, and adapted for effecting a change in the relative velocities of said actuators, substantially as described.

35. In a machine for generating gear-teeth, the combination with the oscillatory blank-carrier and it's actuator, and with the oscillatory cutter-carrier and its actuator; of a shiftable reciprocating-connector intermediate to the blank-carrier actuator and cutter-carrier actuator, and adapted for synchronously actuating the blank-carrier and the cutter-carrier actuator; and driving mechanism in operative connection with one of said actuators, substantially as described, and for the purpose set forth.

36. In a machine of the class specified, the combination with the blank-carrier and its actuator; of an oscillatory cutter carrier having a sector, at one side thereof; a reciprocatory-rack in mesh with said sector; actuating mechanism for said rack; and a connector between said rack and the gear-blank-carrier actuator, substantially as described.

37. In a machine of the class specified, the combination with the oscillatory blank-carrier and its actuator; of an oscillatory cutter-carrier; and a cutter-carrier actuator operatively connected for synchronous movement with the blank-carrier actuator, and consisting of a sector carried by the cutter-carrier; a slide supported for vertical reciprocation, and having a rack in mesh with the sector; a driving-wheel; and a pitman adjustably connected at one end with the driving-wheel, and pivotally connected at its opposite end with the rack-slide; and adapted for reciprocating said rack, to impart oscillatory movements to the cutter-carrier and blank-carrier in synchronism, substantially as described.

38. In a machine of the class specified, in combination, a cutter-carrier supported for oscillatory movements; a blank-carrier supported for rotary-reciprocating movements; a cutter-carrier actuator having a vertically-reciprocating member; a blank-carrier actuator having a horizontally-reciprocating member; a traverse-bar carried by the reciprocating-member of one of said actuators, and having a sliding-connection with the reciprocating-member of the other of said actuators; and means for reciprocating said traverse-bar, to synchronously actuate the cutter-carrier and the blank-carrier, substantially as described, and for the purpose set forth.

39. In a machine of the class specified, the combination with the oscillatory cutter-carrier and its actuator; and with the rotary-reciprocatory blank-carrier and its actuator; of a traverse-bar adjustably carried by one of said actuators, and having a sliding-connection with the other of said actuators; and actuating mechanism in connection with the traverse-bar carrier, and adapted for synchronously actuating the cutter-carrier and the blank-carrier, substantially as described.

40. In a machine of the class specified, the combination with the cutter-carrier having a reciprocatory member, and with a blank-carrier actuator and its reciprocatory member; of a traverse-bar pivotally connected, approximately midway of its length to one of said reciprocatory members, and having a sliding-connection with the other of said reciprocatory members; an adjusting means in connection with said traverse-bar and its carrier, and adapted for effecting a change in the angular relation of said traverse-bar to said reciprocatory members, substantially as described.

41. In a machine of the class specified, a cutter-carrier actuator having a vertically-reciprocatory member; and a blank-carrier actuator having a horizontally-reciprocatory member, in combination with a traverse-bar having sliding-connection with the horizontally-reciprocatory member, and having a pivotal connection with the vertically-reciprocatory member; an adjusting device carried by the vertically-reciprocating member, and in operative connection with the traverse-bar; and an indicator co-operating with said adjusting device, to indicate the angular position of the traverse-bar, relatively to the horizontally-reciprocating members, substantially as described.

42. In a machine of the class specified, two independent radius-bars supported for oscillatory movement, and having concentric axes, at the inner ends thereof, and supported at their outer ends, for transverse adjustment, relatively to each other; in combination with two independent cutter-carrying slides supported by the two radius-bars, respectively, for movement longitudinally, of said bar; oscillating mechanism in operative connection with the radius-bars; and feeding mechanism in operative connection with, and adapted for, simultaneously imparting, a feeding movement to the two cutter-slides, substantially as described, and for the purpose set forth.

43. In a machine of the class specified, the combination, with the two transversely-adjustable, cutter-slide-carrying radius-bars, and with the cutter-slides carried thereby; of a pair of feed-screws carried by the two radius-bars, respectively, having screw-threaded bearings in the two cutter-slides, respectively; a telescopic universal shaft, journaled at opposite ends in bearings upon the two radius-bars, respectively, and operatively connected with the feed-screws by means of gearing; and means, substantially as described, for actuating said shaft and feed-screws, simultaneously, substantially as described.

44. In a machine of the class specified, the combination with the blank-mechanism frame having a segmental guideway; of a slide supported for adjustment concentric with said guideway, and having transverse blank-carrier-supporting bearings, and a blank-carrier supported for longitudinal adjustment and rotary reciprocations in said bearings, and comprising a cylindrical bearing or sleeve supported for longitudinal adjustment in the bearings of the slide, and carrying means for adjusting the same transversely of said slide; and a blank-carrying spindle carried for rotary reciprocations in said cylindrical bearing, and adapted for longitudinal movement with said bearings, substantially as described.

45. In a machine of the class specified, the combination with the oscillatory cutter-carrier and its actuator; of a rotary-reciprocating gear-blank carrier supported for radial and concentric adjustment, relatively to an arbitrarily-fixed axis; an actuator in operative connection with said blank-carrier, and also in operative connection with the cutter-carrier actuator; and an index device carried by said gear-blank carrier, and adapted for indexing the gear-blank, substantially as described, and for the purpose set forth.

46. In a machine of the class specified, the combination with the oscillatory cutter-carrier and its movable cutter-slide and with the cutter-carrier-actuating mechanism; of a stopping device controlled by the movements of the cutter-slide, and adapted for automatically stopping the operation of the actuating mechanism and cutter-slide, substantially as described.

47. In a machine of the class specified, the combination with the oscillatory and radially movable cutter-slide, and with the cutter-slide-actuating mechanism embodying two shiftable clutch-members; of a shifting device in operative connection with one of said clutch-members, and adapted to be automatically operated by the radial movement of the cutter-slide, to throw the clutch-members out of operative engagement, and stop the movement of the cutter-slide, substantially as described.

48. In a machine for generating gear-teeth, the combination with the frame-work; of a segmental cutter-carrier guideway, and a segmental blank-carrier guideway in rectangular disposition relatively to each other, and having their geometrical axes in substantially the same plane; a cutter-carrier movably supported on the cutter-carrier guideway; a blank-carrier movably supported on the blank-carrier guideway; and means for actuating said carriers, substantially as described.

49. In a machine for generating gear-teeth, the combination with the frame-work having a vertically-disposed segmental guideway; of a segmental gear-blank-carrier slide adjustably supported by said guideway; a rotary-reciprocatory blank-carrier adjustably carried by said slide; and means in operative connection with, and adapted for imparting a rotary-reciprocatory movement to the blank-carrier, substantially as described, and for the purpose set forth.

50. In a machine for generating gear-teeth, the combination with the frame-work, having the segmental blank-carrier-supporting guideway; and with the rotary-reciprocatory blank-carrier; of a pinion carried by said carrier; an oscillatory segmental rack supported for oscillatory movements; and a pair of gears intermediate to, and operatively connecting the oscillatory rack and the pinion upon, the blank-carrier, substantially as described, and for the purpose set forth.

51. In a machine for generating gear-teeth, the combination with the frame-work and with the rotary-reciprocatory blank-carrier; of a segmental rack pivotally supported for oscillatory movement, in a bearing upon the frame; a train of gears operatively connecting the blank-carrier and oscillatory rack; and means in operative connection with and adapted for oscillating said rack, substantially as described.

52. In a machine for generating gear-teeth, the combination with the frame-work and with the cutter-carrier and gear-blank carrier; of two oppositely-disposed sectors, one of which is in operative connection with the cutter-blank carrier, and the other of which is in operative connection with the gear-blank carrier, and both of which are operatively connected together for synchronous movement; and means for synchronously actuating said sectors, substantially as described, and for the purpose set forth.

53. In a machine for generating gear-teeth, the combination with the frame-work having a segmental guideway; of the blank-carrier slide adjustably carried by said guideway; a rotary-reciprocatory blank-carrier supported for transverse adjustment, relatively to said slideway; a driven-gear carried by said carrier; a driving-gear in mesh with said driven-gear; a bevel-gear carried by the driving-gear; an oscillatory segmental bevel-gear in mesh with the first-mentioned bevel-gear; and means substantially as described for oscillating said segmental gear, to impart rotary-reciprocatory movement to the gear-blank carrier, substantially as described.

HERBERT C. WARREN.

Witnesses:
FRED. J. DOLE,
S. W. POTTS.